United States Patent [19]

Butkiewicz

[11] Patent Number: 5,226,616

[45] Date of Patent: Jul. 13, 1993

[54] MULTI-POSITION SUPPORT STRUCTURE CONNECTING A PAYLOAD TO A BOOSTER ROCKET

[75] Inventor: Mark T. Butkiewicz, Havre de Grace, Md.

[73] Assignee: General Dynamics Corporation, Space Systems Div., San Diego, Calif.

[21] Appl. No.: 777,965

[22] Filed: Oct. 17, 1991

[51] Int. Cl.⁵ .............................................. B64G 1/22
[52] U.S. Cl. ................................ 244/158 R; 244/172; 410/156
[58] Field of Search ............... 244/158 R, 160, 161, 244/164, 172, 162, 120, 117 R, 1 N; 188/311, 313, 297, 299; 410/156, 151, 143, 145

[56]  References Cited

U.S. PATENT DOCUMENTS 3,703,998  11/1972  Girard .............................. 244/120
4,536,114  8/1985  Belew .............................. 244/158 R Primary Examiner—Joseph F. Peters, Jr.
Assistant Examiner—Anne E. Bidwell
Attorney, Agent, or Firm—Frank D. Gilliam; John R. Duncan

[57]  ABSTRACT

The support structure takes the form of a load isolating payload support strut assembly whose length can be selectively shortened between fully extended and fully compressed to vary the spacing between the payload and the booster rocket during different stages of a flight. The strut assembly would allow independent motion of a separately supported booster rocket and payload during ascent, and subsequently provide a rigid interface during the rocket's flight, which would allow an increase in the capacity of space transferred payloads.

7 Claims, 1 Drawing Sheet

MULTI-POSITION SUPPORT STRUCTURE CONNECTING A PAYLOAD TO A BOOSTER ROCKET

BACKGROUND OF THE INVENTION

The present invention relates to adjustable length support structure and more specifically to a multi-position support structure used to connect a payload to a booster rocket.

Presently space exploration requires booster rockets to transmit payloads into predetermined orbits around the earth. The Shuttle-C Space Transportation System will use the Titan version of Centaur for space transfer of payloads of the shuttle's orbit to higher orbits. If the payload is rigidly attached to the Centaur during the Shuttle-C ascent, its weight would be limited to the Centaur's structural capacity. However, a strut system that would allow independent motion of a separately supported Centaur and payload during ascent, and subsequently provide a rigid interface during Centaur flight, would allow an increase in the capacity of space transferred payloads up to the Shuttle-C weight limit.

The object of the invention is to provide a novel multi-position support structure for connecting a payload to a booster rocket that will provide a soft interface during Shuttle-C ascent and transition to hard interface with a payload alignment for the Centaur flight.

It is also an object of the invention to provide a novel multi-position support structure connecting a payload to a booster rocket that will allow an increase in the amount of payload to be used with the booster rocket.

SUMMARY OF THE INVENTION

The novel multi-position support structure connecting a payload to a booster rocket has been designed for the Shuttle-C Space Transportation System. The support structure has a self-contained hydraulic actuator that would provide a soft interface during Shuttle-C ascent and transition to a hard interface with payload alignment for a Centaur flight.

The multi-position support structure has two elongated cylindrical housings having a front end that is telescopically received in the rear end thereof. The interior of the rear cylindrical housing has hydraulic fluid chambers A and B formed on the opposite sides of a balanced piston. One end of the piston rod is connected to the forward cylindrical housing and the other end of the piston rod passes through the bore in the payload alignment mechanical stop and enters into hydraulic fluid chamber C. Hydraulic fluid chamber C has a rear end wall that separates it from a hydraulic pressure reservoir. A larger chamber D is located in the forward cylindrical housing and is interconnected to chamber C via a hollow piston rod, increasing the effective volume of chamber C. The respective hydraulic chambers A, B and C, and the hydraulic pressure reservoir are connected by fluid flow paths having valves therein that allow the following three/phases of its operation to be performed. During ascent, valves G, E and F are in a predetermined position in which valves G and F are open and valve E is closed, allowing three flow of fluid from hydraulic pressure reservoir to fill both sides of the piston resulting in a "floating" uncoupled payload. Once in orbit and prior to separation of the payload from its ascent support fixture, the valves G, E and F are energized to a predetermined position 2 in which all the valves are closed temporarily rigidizing the payload coupling. After rotation of the Centaur/Payload from the support fixture the respective valves G, E and F are energized to a predetermined position 3 in which G and E are open and F closed. This allows pressurizing hydraulic fluid from the hydraulic reservoir 36 to enter the hydraulic fluid chamber A, forcing the piston to translate toward hydraulic fluid chamber B venting the Centaur-side fluid (chamber B) r reservoirs (chambers C and D) allowing the payload/side fluid to compress the strut to the mechanical stop, fixing the payload relative to the Centaur. An orifice in the line limits the rate at which the strut compresses. In predetermined valve position 1, valves G and F are open and valve E is closed. In predetermined position 2, all three valves are closed. In predetermined position 3, valve G and E are open and valve F is closed.

Applicant's novel design provides a highly reliable method of attaching and aligning independently supported upper stages in a low orbit environment.

DESCRIPTION OF THE PREFERRED EMBODIMENT

Figure 1:
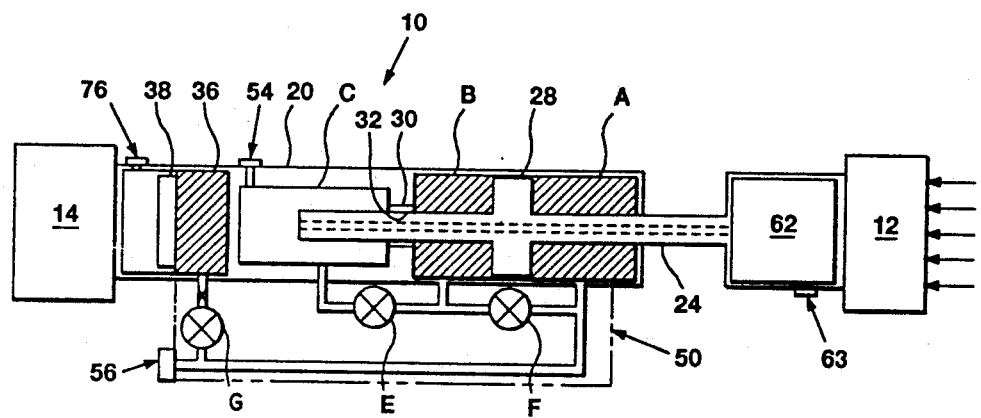
FIG. 1 is a schematic illustration of the novel multi-position support structure connecting the payload to a booster rocket.

The novel multi-position support structure for connecting a payload to a booster rocket will now be discussed by referring to FIGS. 1 and 2. The payload support structure assembly is generally designated numeral 10. It is connected at its front end to a payload 12 and at its rear end to a booster rocket 14 such as a Centaur.

Figure 2:
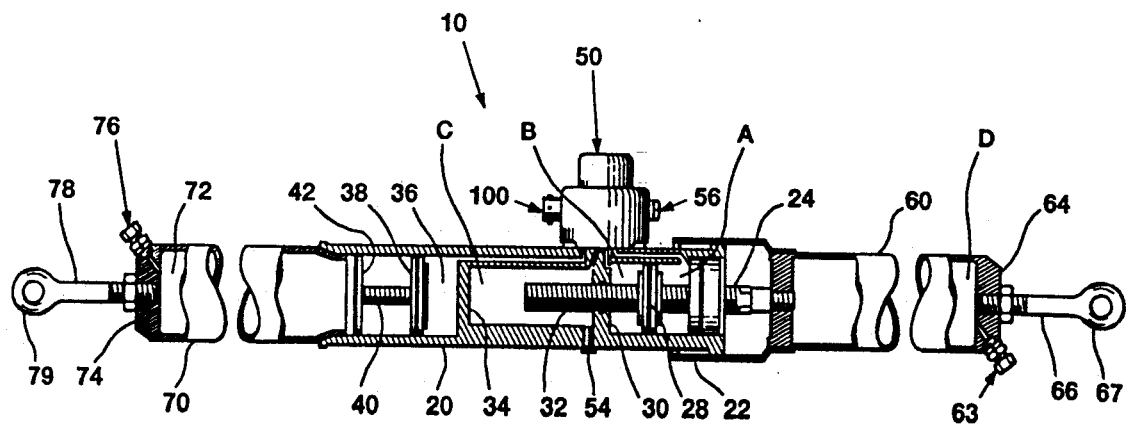
FIG. 2 is a side elevation view of the novel load isolating payload support structure assembly with portions shown in cross-sectional view.

Payload support structure assembly 10 has a rear elongated cylindrical housing 20 whose front end is telescopically received in the rear end of a dust cap sleeve 22 (see FIG. 2). A piston rod 24 has its front end connected to the front cylindrical housing 60. A piston 28 is mounted on piston rod 24 and it has a hydraulic fluid chamber A formed adjacent its front end and a hydraulic fluid chamber B formed adjacent its rear end. Preferably, but not by way of limitation, the piston and the piston rod will be machined as one piece. Rearward travel of piston 28 is restricted by payload alignment mechanical stop 30. It has a bore 32 through which the rear end of piston rod 24 passes. Hydraulic fluid chamber C is formed to the rear of payload alignment mechanical stop 30 and it has a rear wall 34. Hydraulic pressure reservoir 36 which contains hydraulic fluid under pneumatic pressure is formed in cylindrical housing 20 between rear end wall 34 and piston 38. A piston rod 40 has its front end connected to piston 38 and its rear end connected to an anti-binding piston 42. Conventional state of the art seals are utilized between the interior of cylindrical housing 20 and the respective members mounted therein.

Flow control valve assembly 50 is a four way, three position valve. It actuates valves G, E and F in the respective fluid flow paths between hydraulic fluid chambers A, B and C, and hydraulic pressure reservoir 36. A fill and bleed valve 56 is connected to flow control valve assembly 50. The valve is controlled by a low current electrical signal supplied through electrical connector 100.

Hydraulic fluid chamber C has an inspection and testing port that is closed by inspection plug 54.

A front tubular member 60 is connected to the front end of piston rod 24 and it has a pneumatic relief reservoir chamber D having a pneumatic charge valve 63. The front end wall 64 of front tubular member 60 has an anchor rod 66 fastened into it and it has an eyelet 67 formed at its front. The hollow piston rod 24 allows communication between chambers C and D.

Rear tubular member 70 is attached to the rear end of cylindrical housing 20 and it has a pneumatic chamber 72 whose front end is closed by piston assembly 38 and whose rear end is closed by end wall 74. An accumulator pneumatic charge valve 76 is connected to the interior of a pneumatic chamber 72. An anchor rod 78 is fastened to rear end wall 74 and it has an eyelet 79 formed at its rear end.

The payload support strut assembly 10 is approximately three feet long in its present application form. Its respective front and rear ends are connected by its eyelets to the respective payloads and booster rocket structure.

What is claimed is:

1. A multi-position support structure connecting a pay load to a booster rocket comprising:
    a payload having a rear end;
    a booster rocket having a front end;
    at least one load isolating payload support strut assembly having a front end that is connected to the rear end of said payload and also having a rear end that is connected to the front end of said booster rocket, said strut assembly comprising pneumaticly pressurized hydraulic fluid and valving means comprising an elongated cylinder housing having a front end that is telescopically received in the rear end of a dust cap sleeve for allowing lengthening and shorting the length of said strut assembly to vary the spacing between said payload and said booster rocket during different stages of their flight; and
    an elongated piston rod having a front end that is connected to said dust cap sleeve, a piston is mounted on said piston rod and said piston travels back and forth in a cylindrical bore in the front end of said cylinder housing, a front end wall closes the front end of said cylindrical bore, a hydraulic fluid chamber A is formed in front of said piston and a hydraulic fluid chamber B is formed behind said piston.

2. A multi-position support structure connecting a payload to a booster rocket as recited in claim 1 further comprising a payload alignment mechanical stop in said cylindrical housing that forms the rear wall of hydraulic fluid chamber B, said payload alignment mechanical stop having a bore through which said piston rod passes.

3. A multi-position support structure connecting a payload to a booster rocket as recited in claim 2 further comprising a hydraulic fluid chamber C formed in said cylindrical housing rearwardly of said payload alignment mechanical stop.

4. A multi-position support structure connecting a payload to a booster rocket as recited in claim 3 further comprising said hydraulic fluid chamber C having a rear end wall and a hydraulic fluid pressure reservoir is formed in said cylindrical housing adjacent said rear end wall.

5. A multi-position support structure connecting a payload to a booster rocket as recited in claim 3 further comprising fluid flow paths interconnecting said hydraulic fluid chambers A, B and C, flow control valve means for transferring hydraulic fluid between said respective hydraulic fluid chambers to cause the piston in said cylindrical housing to travel to its different operative positions.

6. A multi-position support structure connecting a payload to a booster rocket as recited in claim 2 further comprising a front tubular member connected to the front end of said dust cap sleeve, a relief reservoir chamber is formed therein and it has a charge valve.

7. A multi-position support structure connecting a payload to a booster rocket as recited in claim 2 further comprising a rear tubular member connected to the rear end of said cylindrical housing and it has a pneumatic chamber formed therein that includes a accumulator pneumatic charge valve.

* * * * *

UNITED STATES PATENT AND TRADEMARK OFFICE
CERTIFICATE OF CORRECTION

PATENT NO. : 5,226,616
DATED : July 13, 1993
INVENTOR(S) : M. T. Butkiewicz

It is certified that error appears in the above-indentified patent and that said Letters Patent is hereby corrected as shown below:

Insert on page 1, column 1, after line 6,

"The invention described herein was made in the performance of work under NASA Contract No. NAS3-24900 and is subject to the provisions of Section 305 of the National Aeronautics and Space Act of 1958 (42 U.S.C. 2457)."

Signed and Sealed this

Fifteenth Day of March, 1994

Attest:

BRUCE LEHMAN

*Attesting Officer*   *Commissioner of Patents and Trademarks*